United States Patent [19]

Locascio et al.

[11] Patent Number: 5,737,685
[45] Date of Patent: Apr. 7, 1998

[54] CO-LOCATED SUBSCRIBER UNIT TO SUBSCRIBER UNIT COMMUNICATION WITHIN A SATELLITE COMMUNICATION SYSTEM

[75] Inventors: Robert J. Locascio, Crystal Lake; Michael W. Frenzer, Palatine; Michael P. Gaynor, Elgin; Christopher N. Kurby, Elmhurst; Joan E. Zocher, Schaumburg, all of Ill.

[73] Assignee: Motorola, Inc., Schaumburg, Ill.

[21] Appl. No.: 575,269

[22] Filed: Dec. 20, 1995

Related U.S. Application Data

[63] Continuation of Ser. No. 310,355, Sep. 21, 1994, abandoned, which is a continuation of Ser. No. 841,129, Feb. 25, 1992, abandoned.

[51] Int. Cl.$^6$ .................................................. H04B 7/212
[52] U.S. Cl. ........................ 455/12.1; 455/13.1; 455/34.1
[58] Field of Search .............................. 455/11.1, 12.1, 455/13.1, 13.2, 15, 16, 17, 34.1, 34.2, 54.1, 56.1, 63; 370/95.1, 95.3

[56] References Cited

U.S. PATENT DOCUMENTS 4,506,383  3/1985  McGann ............................ 455/13.1
4,979,170  12/1990  Gilhousen et al. ................. 455/12.1

*Primary Examiner*—Reinhard J. Eisenzopf
*Assistant Examiner*—Thanh Le
*Attorney, Agent, or Firm*—Daniel W. Juffernbruch; Darleen J. Stockley

[57] ABSTRACT

A satellite communication system (SCS)(100) and method (300) are provided that provide a geographically co-located user assignment system. For unit-to-unit communication, each group of subscriber units is instructed to operate in a half-duplex unit to unit mode. The geographically co-located user assignment system comprises an assignment unit (201), a storage unit (203), and an instruction unit (205) such that a first subscriber unit (204) initiates unit to unit communication with at least a second subscriber unit (206, ...) in the first subscriber unit's user group utilizing a multiple access channel assigned to that group by transmitting on an assigned satellite downlink frequency of the multiple-access channel on a push-to-talk basis.

16 Claims, 4 Drawing Sheets

FIG.1 — PRIOR ART —

CO-LOCATED SUBSCRIBER UNIT TO SUBSCRIBER UNIT COMMUNICATION WITHIN A SATELLITE COMMUNICATION SYSTEM

This is a continuation of application Ser. No. 08/310,355, filed Sep. 21 1994, abandoned, which is a continuation of Ser. No. 07/841,129, filed Feb. 25, 1992, abandoned.

FIELD OF THE INVENTION

This invention relates generally to the field of satellite communication, and more particularly to satellite subscriber unit to subscriber unit communication with a user group.

BACKGROUND

Satellite communication systems typically utilize frequency management, power regulation, and positioning of satellites and earth-based units to provide for a multiple access communication system between users. In general, a signal is sent up by a transmitting earth-based unit to a satellite. The satellite then amplifies and retransmits the signal over an entire geographical coverage area. Earth-based units in the broadcast geographical coverage area may receive the signal and select desired information from the signal. However, generally no provision is made to simplify communication between geographically co-located users.

There is a need for a satellite communication system that provides a simplified method and device for facilitating communication between geographically co-located users.

SUMMARY OF THE INVENTION

A satellite communication system and method are provided that have and provide for, respectively, at least a geographically co-located user assignment system for at least facilitating geographically co-located user communication. The satellite communication system comprises at least a predetermined number of communication satellites arranged in orbit around the earth such that at least a first satellite is capable of at least receiving signals and retransmitting the signals to at least one of: a second satellite, an earth-based unit, and a subscriber unit, and has a geographically co-located user assignment system. The geographically co-located user assignment system comprises at least an assignment unit, a storage unit, and an instruction unit such that, within each preassigned group of subscriber unit users, a first subscriber unit initiates unit to unit communication with at least a first target subscriber unit in the first user group utilizing a multiple access channel assigned to that group by transmitting on an assigned satellite downlink frequency of the multiple-access channel on a push-to-talk basis. The assignment unit provides for assignment of at least a first satellite downlink frequency of a multiple-access channel to at least a first group of subscriber unit users that are geographically co-located. The storage unit is responsive to the assignment unit and is utilized for storing a list of each group of subscriber unit users. The instruction unit is responsive to the assignment unit and is utilized for instructing each group of subscriber unit users to operate in a half-duplex unit to unit mode.

BRIEF DESCRIPTIONS OF THE DRAWINGS

FIG. 1, numeral 100, illustrates a satellite communication system as is known in the art.

DETAILED DESCRIPTION OF A PREFERRED EMBODIMENT

Figure 1:
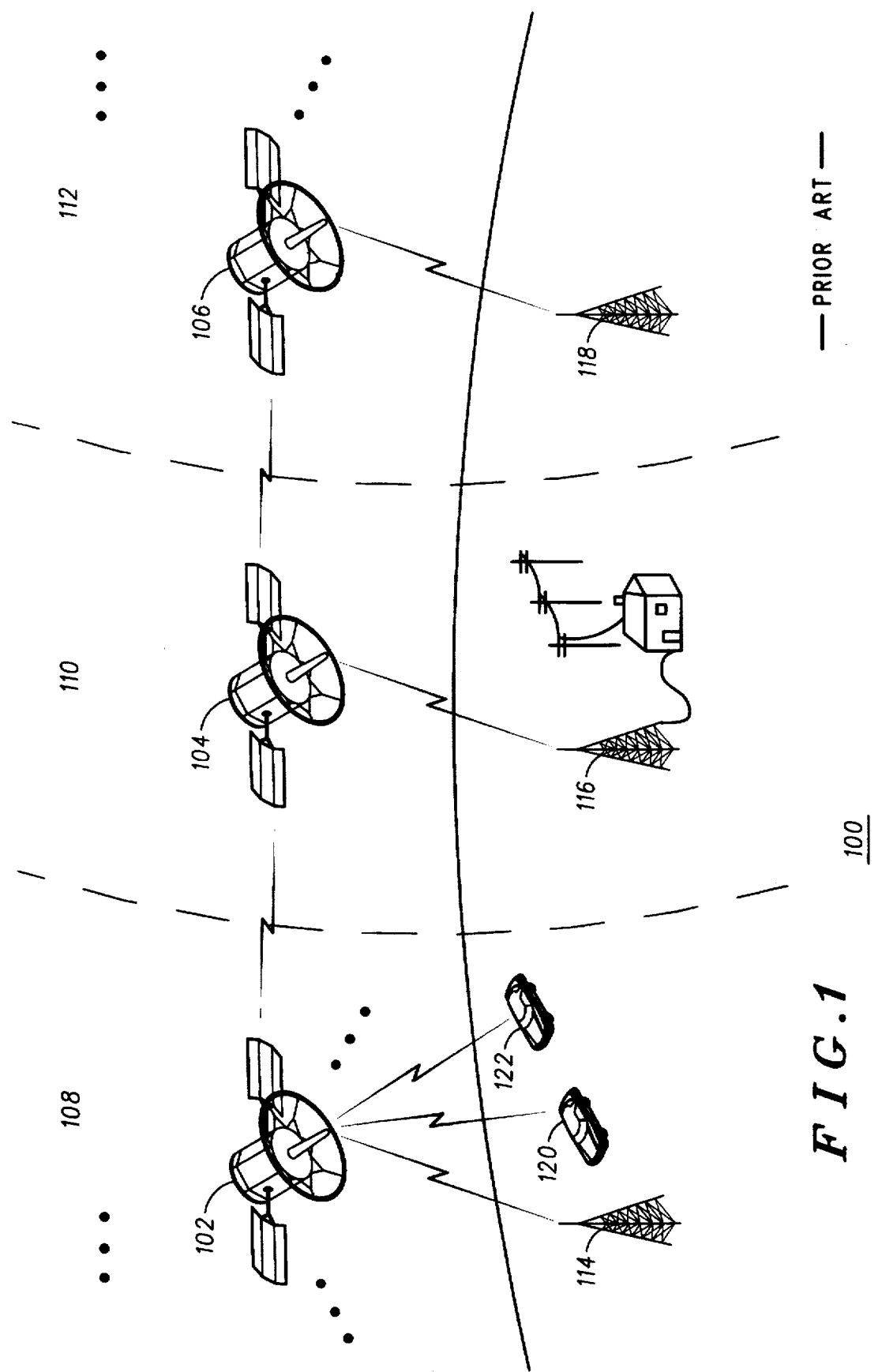

FIG. 1, numeral 100, illustrates a satellite communication system as is known in the art. Generally, a predetermined number of satellites (102, 104, 106, . . . ) are placed in orbits around the earth such that each satellite provides coverage for a selected geographical area (108, 110, 112, . . . ) utilizing an earth-based unit (114, 116, 118, . . . ). Typically, each earth-based unit may transmit a signal to a satellite that provides coverage for the geographical area in which the earth-based unit is located (114, 108; 116, 110; 118, 112; . . . ). Then the satellite (102, 104, 106, . . . ) amplifies and retransmits the signal to subscriber units (120, 122, . . . ). The communication system further has at least a geographically co-located user assignment system for at least facilitating geographically co-located subscriber unit communication.

Geographically co-located subscriber units are located in a geographic area served by a particular communication satellite. Thus, the satellite communication system has at least a predetermined number of communication satellites (102, 104, 106, . . . ) arranged in orbit around the earth such that at least a first satellite (102) is capable of at least receiving signals and retransmitting the signals to at least: a second satellite (104), an earth-based unit (114), or a subscriber unit (120, 122, . . . ). The predetermined number of communication satellites is selectable, at least two being desirable.

Figure 2:
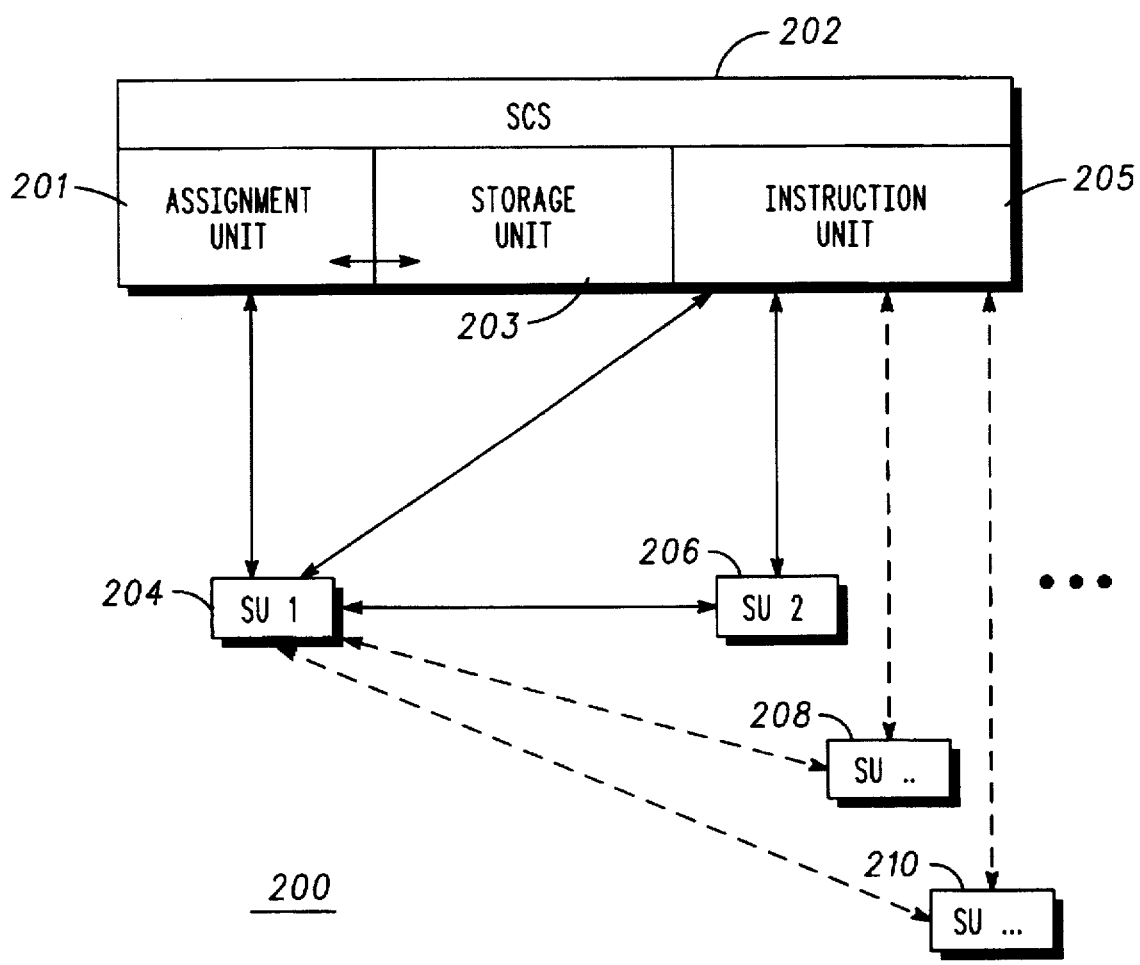
FIG. 2 illustrates a block diagram of a first embodiment of a satellite communication system for at least facilitating geographically co-located subscriber unit communication in accordance with the present invention.

FIG. 2, numeral 200, illustrates a block diagram of a first embodiment of a satellite communication system (SCS) (202) for at least facilitating geographically co-located user communication in accordance with the present invention. The satellite communication system generally is arranged as described above. In addition, the satellite communication system includes a geographically co-located user assignment system that comprises an assignment unit (201), a storage unit (203), and an instruction unit (205). The assignment system is activated by the assignment unit (201) of a first satellite of the SCS (202) when a subscriber unit (SU 1) (204) of a geographically co-located at least first user group of subscriber units (GCS) requests a call set-up from the SCS (202) for at least a first target subscriber unit (SU 2, . . . ) (206, . . . ) of the GCS. The assignment unit (201) provides at least a first satellite downlink frequency of a multiple-access channel to at least the first group of subscriber units that are geographically co-located.

The assignment unit (201) transmits a list of the SU 1 (204) and target subscriber unit(s) (206, 208, 210 . . . ) to a storage unit (203), typically which stores the list. The assignment unit (201) causes an instruction unit (205) to instruct the SU1 (204) and the target subscriber unit(s) (SU2, . . . ) (206, . . . ) to operate in a half-duplex unit to unit mode such that the SU 1 (204) initiates unit to unit communication with the target subscriber unit(s) (SU2, . . . ) (206, . . . ) in the first subscriber unit group utilizing the multiple access channel assigned to that group by transmitting on the assigned satellite downlink frequency of the multiple-access channel on a push-to-talk basis. The storage unit (203) is typically located in an earth-based unit (not shown) of the SCS (202) that is geographically co-located with the group of subscriber units, but may be selected to be in a predetermined satellite. The instruction unit (205) is typically located in a satellite that transmits to a geographical co-location area of the group of subscriber units.

Thus, call set-up is accomplished by communication between the SCS and the requesting and target subscriber units such that, typically, voice or data messages may be transmitted and received between the requesting and target subscriber units.

Typically, the multiple-access channel is a time-divison multiple-access (TDMA) channel or a frequency-division multiple-access (FDMA) channel.

Where preselected, at least two of the subscriber units, for example SU 1 and SU 2, of at least a first group of subscriber unit users may be preprogrammed to facilitate automatic initiation of unit to unit communication when a predetermined satellite downlink frequency is assigned on the multiple-access channel.

Figure 3:
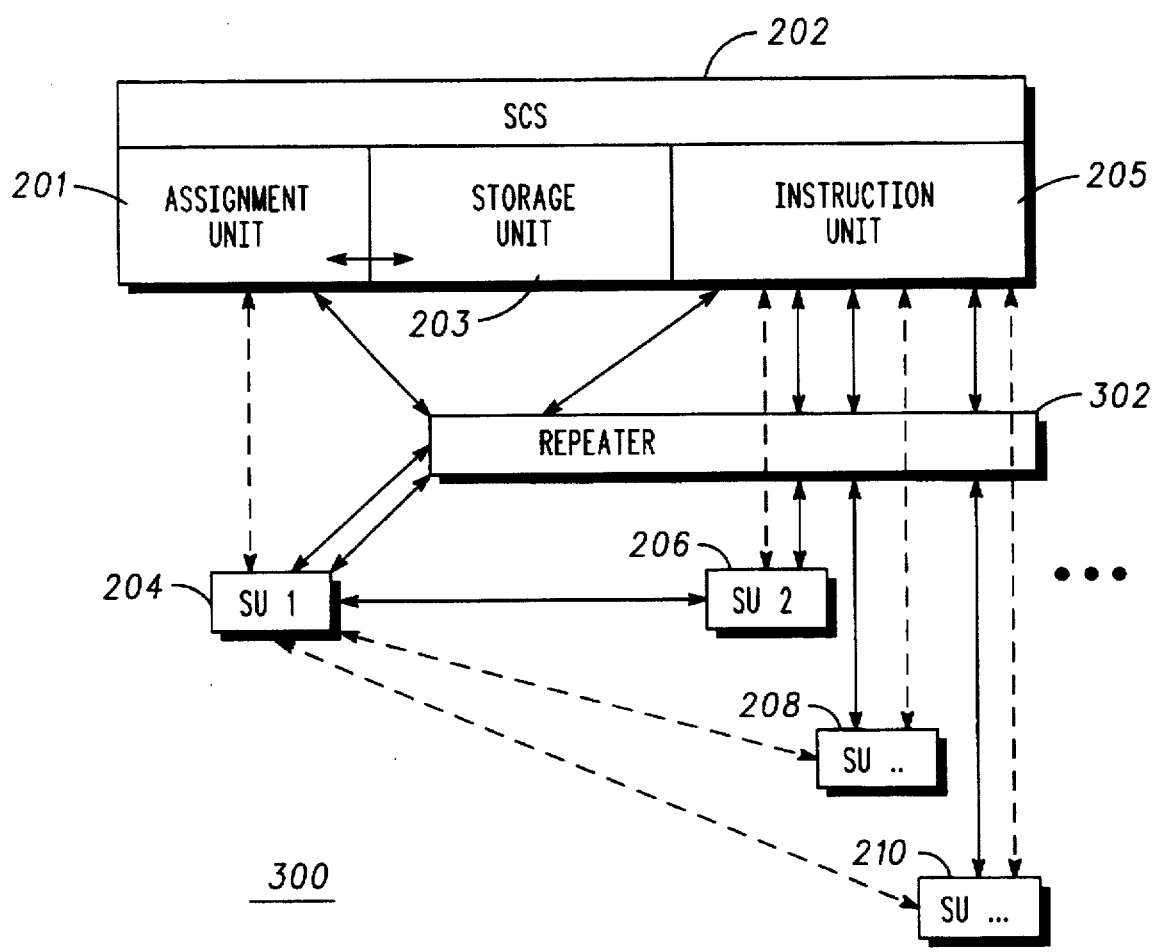
FIG. 3 illustrates a block diagram of a second embodiment of a satellite communication system for at least facilitating geographically co-located subscriber unit communication in accordance with the present invention.

FIG. 3, numeral 300, illustrates a block diagram of a second embodiment of a satellite communication system for at least facilitating geographically co-located user communication in accordance with the present invention. In the second embodiment, in addition to the elements set forth above for the first embodiment, at least a first repeater (302) is utilized to facilitate communication between SU 1 (204) and the at least first target subscriber unit (206, 208, 210, ...). The at least first repeater (302) is utilized by at least a first geographically co-located group of users and is responsive to the subscriber units (204, 206, 208, 210, ...) of the group, at least the first satellite, and, where selected, to the earth-based unit for the group (302, ...). The at least first repeater (302, ...) typically is utilized to facilitate communications between the SU 1 (204), the target subscriber unit(s) (206, 208, 210, ...) and the at least first satellite. Thus, the at least first repeater (302, ...) may be utilized to retransmit signals between a satellite of the SCS and the subscriber units (204, 206, 208, 210, ...), or alternatively, to retransmit signals between an earth-based unit of the SCS and the subscriber units (204, 206, 208, 210, ...). The SU 1 (204) and the target subscriber unit(s) (206, 208, 210, ...) may also, where selected, communicate directly with the at least first satellite.

Thus, call set-up is accomplished by one of: communication between the SCS and the requesting and target subscriber units, and communication between the SCS and at least a first repeater that operably couples the requesting and target subscriber units to the SCS, such that, typically, voice or data messages may be transmitted and received between the requesting and target subscriber units.

Figure 4:
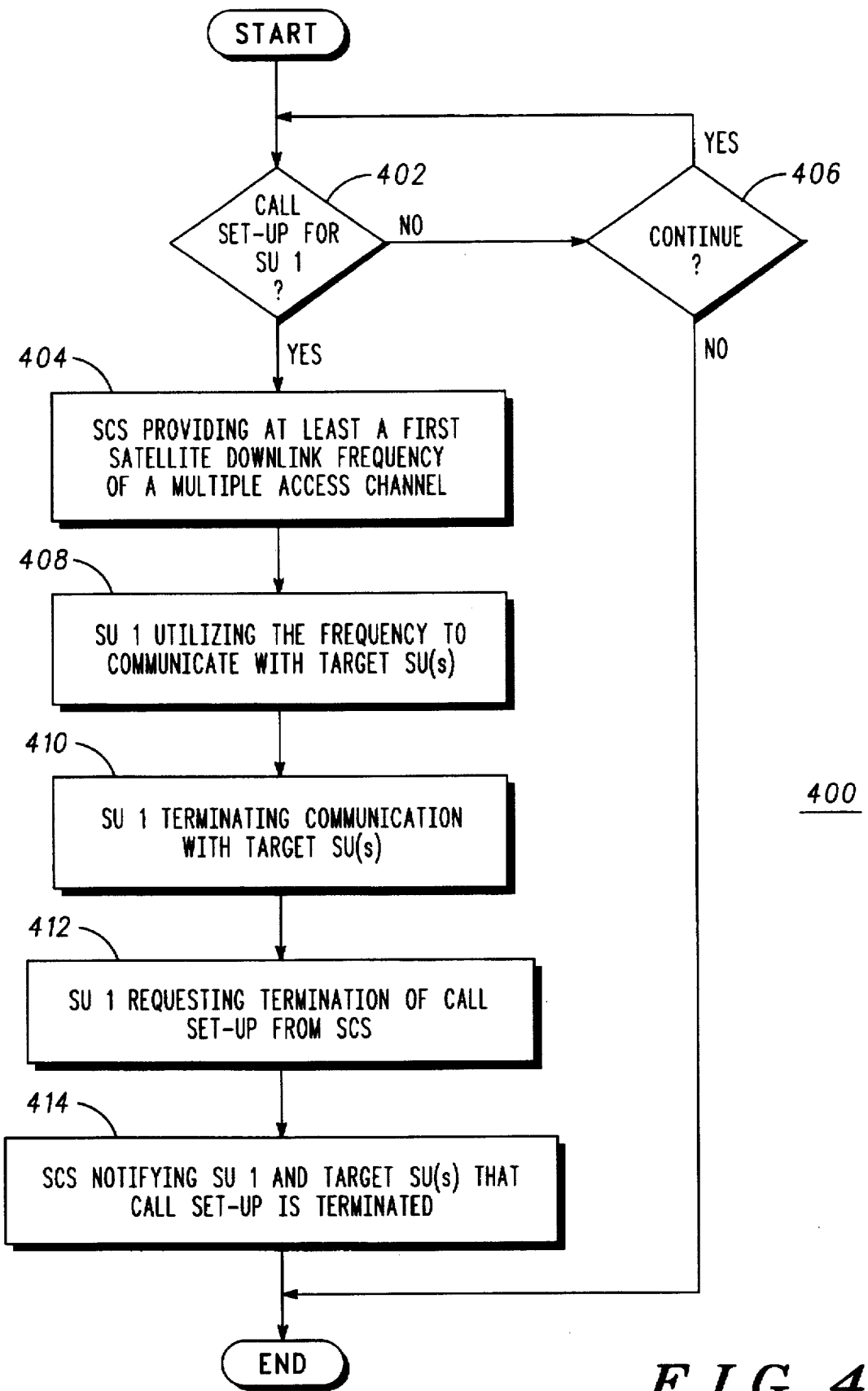
FIG. 4 is a flow chart illustrating a first embodiment of steps in accordance with the method of the present invention for at least facilitating geographically co-located subscriber unit communication.

FIG. 4, numeral 400, is a flow chart illustrating a first embodiment of steps in accordance with the method of the present invention for at least facilitating geographically co-located user (GCU) communication in a satellite communication system (SCS). The SCS is as described above. The method is initiated by requesting call set-up with at least a first target subscriber unit of at least a first group of subscriber unit users that are geographically co-located with at least the first satellite by a first subscriber unit (SU 1) of a first GCU group of the SCS (402). Then, one of the following steps is utilized:

a) where the request for call set-up is granted, the SCS's providing at least a first satellite downlink frequency of a multiple-access channel to the SU 1 and to the target subscriber unit(s) (target SU(s)) and notifying the SU 1 and the target subscriber unit(s) that the call set-up is granted (404), and b) where the request for call set-up is denied, one of (406): recycling to request call set-up by SU 1, and refraining from further requesting of call set-up.

Upon being notified of the granting of the call-set-up, the SU 1 utilizes at least the first satellite downlink frequency to communicate with the target subscriber unit(s) (408). Upon completing the call, the SU 1 terminates the communication with the target subscriber unit(s) (410), and requests termination of the call set-up from the SCS (412).

Last, the SCS notifies the SU1 and the target subscriber unit(s) that the call set-up is terminated (414).

As set forth above for the system of the present invention, the method of the present invention also typically implements a time-divison multiple-access (TDMA) channel or a frequency-division multiple-access (FDMA) channel. Further modifications of the method follow the description of the system above, including utilizing at least a first repeater for at least a first geographically co-located group of users, responsive to the subscriber units of the group, at least the first satellite, and, where selected, to the earth-based unit for the group, for facilitating the first satellite's provision of unit to unit communication between at least two subscriber units of the group, and for facilitating transmission of signals between at least the two subscriber units.

Although exemplary embodiments are described above, it will be obvious to those skilled in the art that many alternations and modifications may be made without departing from the invention. Accordingly, it is intended that all such alterations and modifications be included within the spirit and scope of the invention as defined in the appended claims.

We claim:

1. In a satellite communication system having a predetermined number of communication satellites arranged in orbit around the earth such that a plurality of subscriber units and at least one earth based unit can communicate via the satellites, a geographically co-located user assignment system for facilitating a push-to-talk communication mode for communication among a designated group of subscriber units that are geographically co-located, the assignment system comprising:

an assignment unit for assignment of a same frequency and channel among a plurality of multiple-access channels to a group of subscriber unit users that are geographically co-located, a storage unit, responsive to the assignment unit, for storing a list of each of the subscriber unit users in the group, and an instruction unit, responsive to the assignment unit, for transmitting from at least a first satellite for instructing the subscriber unit users in the group to operate in a push-to-talk unit to unit mode on the assigned same frequency and channel such that, within each group of subscriber units users, a subscriber unit of the group can perform unit to unit communication with other subscriber units of the group utilizing the same frequency and channel assigned to that group by transmitting and receiving on a push-to-talk basis on the assigned same frequency and channel.

2. The assignment system of claim 1, wherein the multiple-access channel is one of: time-division multiple-access and frequency-division multiple-access.

3. The assignment system of claim 1, wherein at least two of the subscriber units of the group of subscriber unit users are programmed to automatically facilitate initiation of unit to unit communication when a predetermined frequency is assigned.

4. The assignment system of claim 1, further comprising a first repeater for at least a first geographically co-located group of users, responsive to the subscriber units of the group, at least the first satellite, and, where selected, to the earth-based unit for the group, for at least facilitating transmission of signals between at least two subscriber units of the group.

5. The assignment system of claim 4, wherein the repeater is utilized for facilitating set-up of the push-to-talk communication mode between at least the first satellite and the subscriber units of the group.

6. In a satellite communication system having a predetermined number of communication satellites arranged in orbit around the earth such that a plurality of subscriber units and at least one earth based unit can communicate via the satellites, a method in a subscriber unit for facilitating a push-to-talk communication mode for communication among a designated group of subscriber units that are geographically co-located, the method comprising the steps of:

A) requesting, from a first subscriber unit to a first satellite, set-up of the push-to-talk communication mode among a group of subscriber unit users that are geographically co-located, B) one of (a)–(c):

a) where the request in said step A) for call set-up of the push-to-talk communication mode is granted, the first subscriber unit receiving notification of assignment to a same frequency and channel among a plurality of multiple-access channels to a group of subscriber unit users that are geographically co-located, b) where the request for set-up of the push-to-talk communication mode is denied, recycling to step A) to re-request set-up of the push-to-talk communication mode, and c) where the request for set-up of the push-to-talk communication mode is denied, refraining from further requests for set-up of the push-to-talk communication mode, C) utilizing the same assigned frequency and channel to communicate with other subscriber unit(s) of the group on a push-to-talk basis, and D) receiving notification from a satellite that the push-to-talk communication mode is terminated.

7. The method in a subscriber unit of claim 6 wherein the multiple-access channel is one of: time-division multiple-access and frequency-division multiple-access.

8. The method in a subscriber unit of claim 6 wherein at least two of the subscriber units of the group of subscriber unit users are programmed to automatically facilitate initiation of unit to unit communication when a predetermined frequency is assigned.

9. The method in a subscriber unit of claim 6 further comprising a first repeater for at least a first geographically co-located group of users, responsive to the subscriber units of the group, at least the first satellite, and, where selected, to the earth-based unit for the group, for at least facilitating transmission of signals between at least two subscriber units of the group.

10. The method in a subscriber unit of claim 9 wherein the repeater is utilized for facilitating set-up of the push-to-talk communication mode between at least the first satellite and the subscriber units of the group.

11. The method in a subscriber unit of claim 6 wherein said step D) further comprises the substeps of D1) terminating communication with subscriber units of the group;

D2) requesting, from a first subscriber unit to a satellite, termination of the push-to-talk communication mode, and D3) receiving notification from the satellite that the pus-to-talk communication mode is terminated.

12. In a satellite communication system having a predetermined number of communication satellites arranged in orbit around the earth such that a plurality of subscriber units and at least one earth based unit can communicate via the satellites, a method in a satellite for facilitating a push-to-talk communication mode for communication among a designated group of subscriber units that are geographically co-located, the method comprising the steps of:

A) receiving a request from a first subscriber unit for set-up of the push-to-talk communication mode among a group of subscriber unit users that are geographically co-located, B) one of (a)–(b):

a) transmitting to the first subscriber unit notification of assignment to a same frequency and channel among a plurality of multiple-access channels for a group of subscriber unit users that are geographically co-located, and b) transmitting to the first subscriber unit notification that the request is denied, C) receiving a request to terminate the push-to-talk communication mode for the group of subscriber units on the same assigned frequency and channel, and D) notifying at least one subscriber unit that the push-to-talk communication mode is terminated after receiving and approving a request to terminate the push-to-talk communication mode for the group of subscriber units.

13. The method in a satellite of claim 12 wherein the multiple-access channel is one of: time-division multiple-access and frequency-division multiple-access.

14. The method in a satellite of claim 12 wherein at least two of the subscriber units of the group of subscriber unit users are programmed to automatically facilitate initiation of unit to unit communication when a predetermined frequency is assigned.

15. The method in a satellite of claim 12 further comprising a first repeater for at least a first geographically co-located group of users, responsive to the subscriber units of the group, at least the first satellite, and, where selected, to the earth-based unit for the group, for at least facilitating transmission of signals between at least two subscriber units of the group.

16. The method in a satellite of claim 15 wherein the repeater is utilized for facilitating the push-to-talk communication mode set-up between at least the first satellite and the subscriber units of the group.

* * * * *